United States Patent [19]

Mullin et al.

[11] Patent Number: 4,807,961
[45] Date of Patent: Feb. 28, 1989

[54] LOCAL AREA NETWORK SYSTEM

[75] Inventors: Francis J. Mullin, Chamblee; William C. Reed, Lilburn; Christian Scholly, Atlanta, all of Ga.

[73] Assignees: American Telephone and Telegraph Company, Murray Hill; AT&T Bell Laboratories, AT&T Technologies, Inc., Berkeley Heights, both of N.J.

[21] Appl. No.: 35,953

[22] Filed: Apr. 8, 1987

[51] Int. Cl.$^4$ .......... G02B 6/00; G02B 6/28; G02B 6/44; G02F 1/00
[52] U.S. Cl. .......... 350/96.23; 350/96.10; 350/96.16; 455/610
[58] Field of Search .......... 350/96.16, 96.23; 455/610, 612

[56] References Cited

U.S. PATENT DOCUMENTS

| | | | |
|---|---|---|---|
| 4,259,540 | 3/1981 | Sabia | 174/23 C |
| 4,290,142 | 9/1981 | Schnee et al. | 455/612 X |
| 4,365,865 | 12/1982 | Stiles | 350/96.23 |
| 4,441,180 | 4/1984 | Schüssler | 455/612 X |
| 4,464,012 | 8/1984 | Khoe et al. | 455/612 X |
| 4,464,013 | 8/1984 | Sabia | 350/96.23 |
| 4,515,435 | 5/1985 | Anderson | 350/96.23 |
| 4,709,418 | 11/1987 | Fox et al. | 350/96.16 |

*Primary Examiner*—William L. Sikes
*Assistant Examiner*—Akm E. Ullah
*Attorney, Agent, or Firm*—Edward W. Somers

[57] ABSTRACT

A communications distribution system (20) provides service for local business and residential premises with fewer splice points required and less waste than encountered in prior art systems. The system includes a feeder distribution interface (60) which is served by a feeder cable or by a carrier system and at least one group interface (61) which is disposed to serve customers' premises. A backbone cable segment (62) extends from the feeder distribution interface to a single group interface and is capable of providing service to a plurality of customer premises. Each customer's premises is served by a single distribution service cable (66) which is connected to a backbone cable segment at a group interface. The single distribution service cables for an area may extend radially or laterally from a group interface.

15 Claims, 8 Drawing Sheets

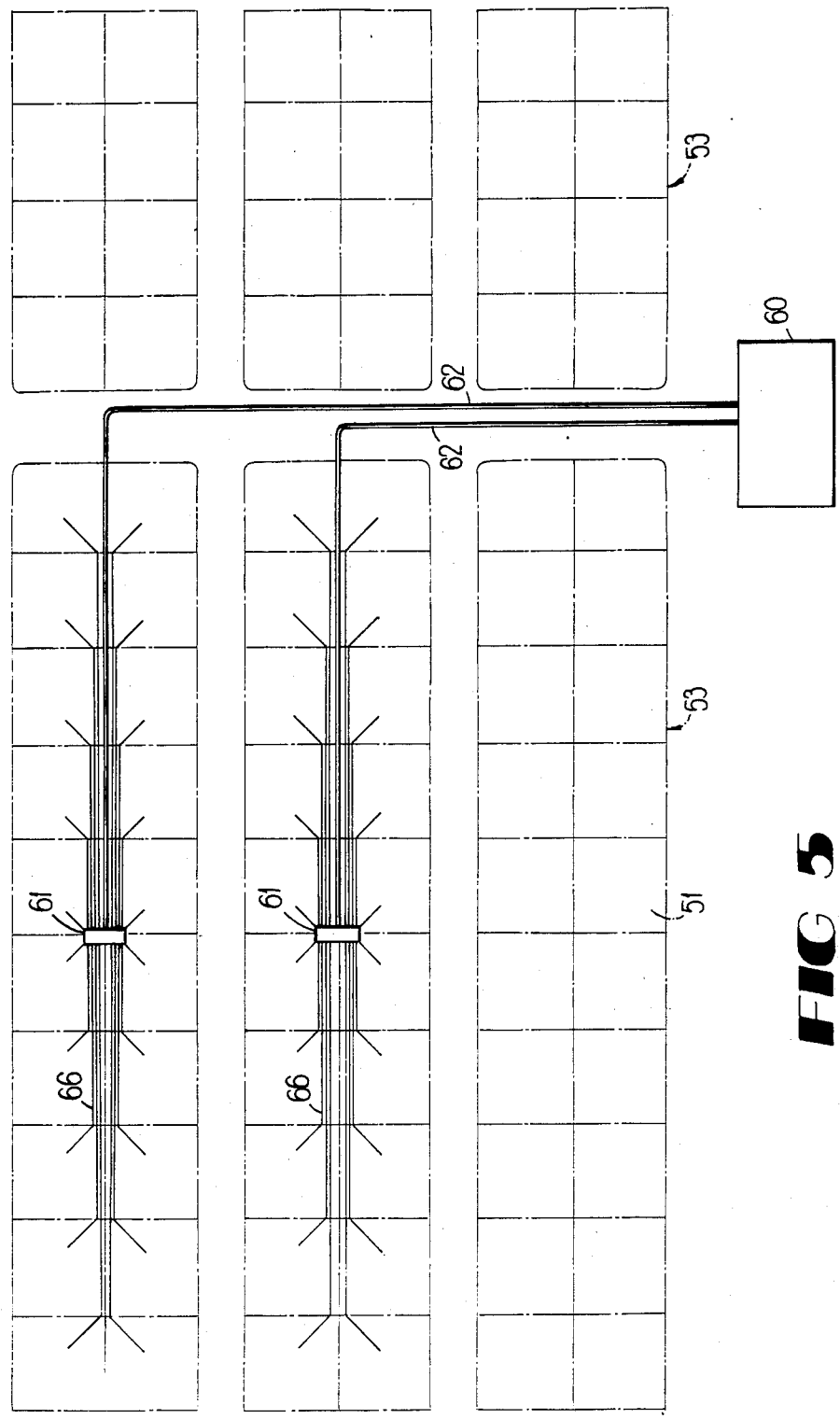

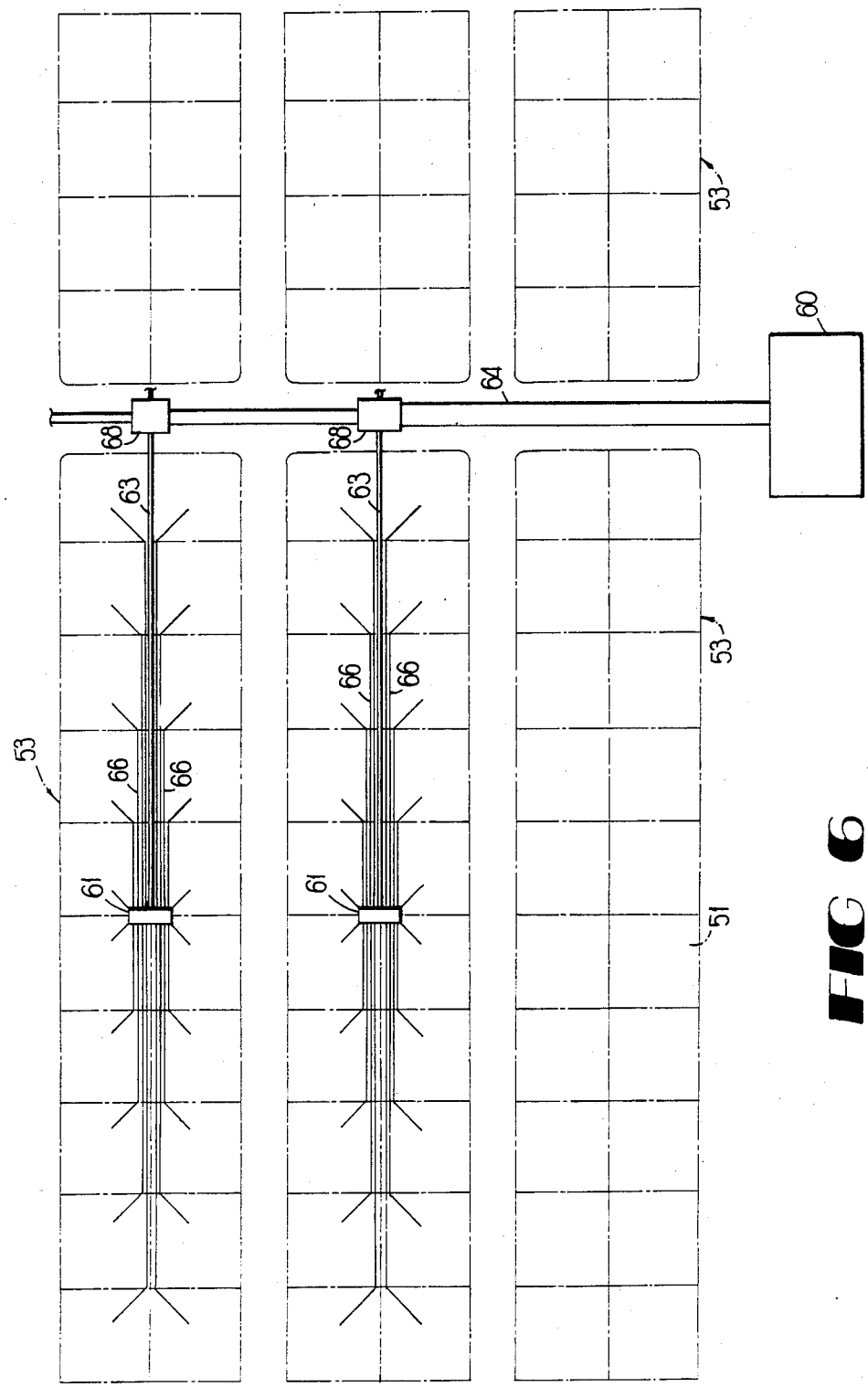

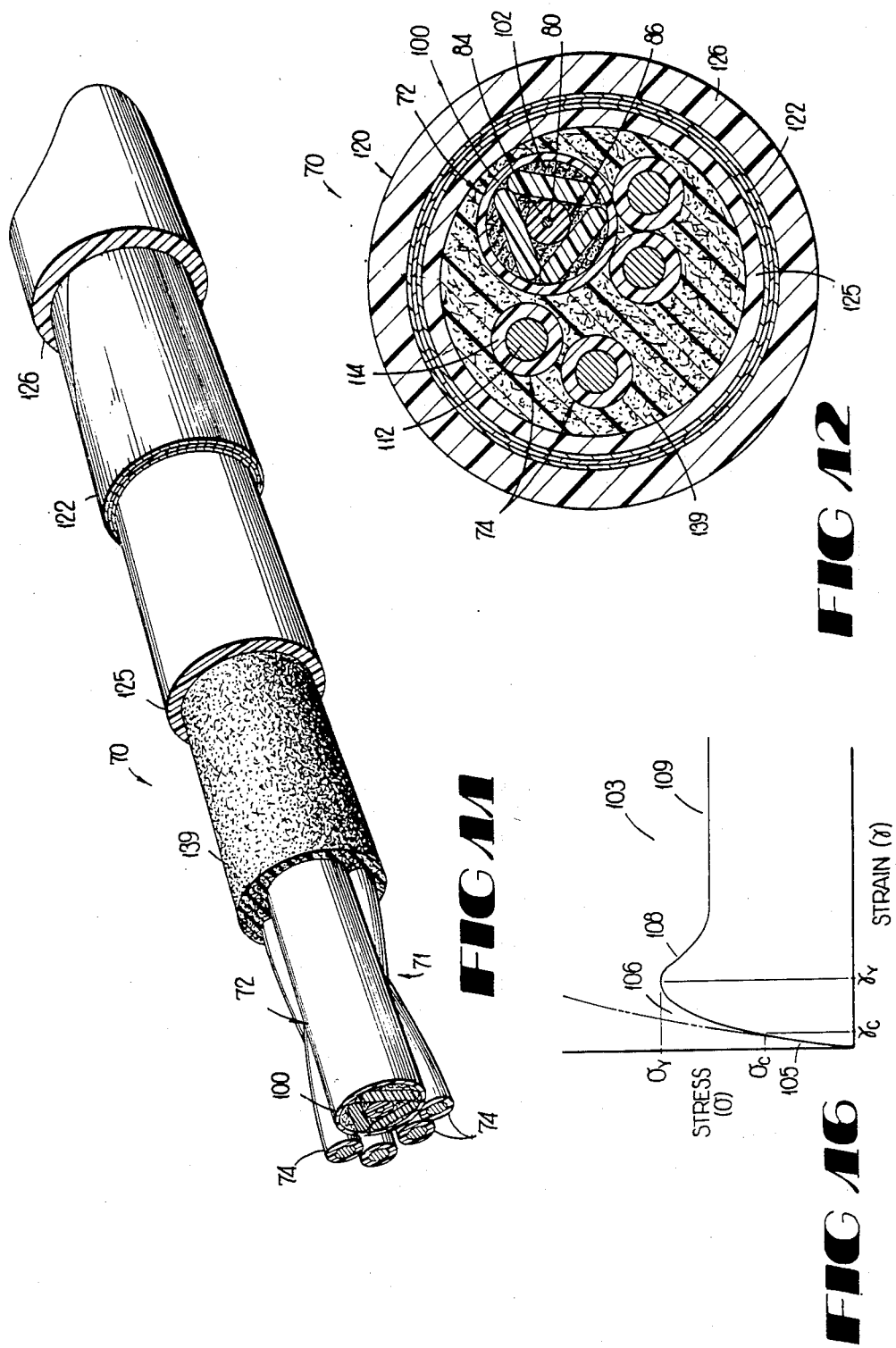

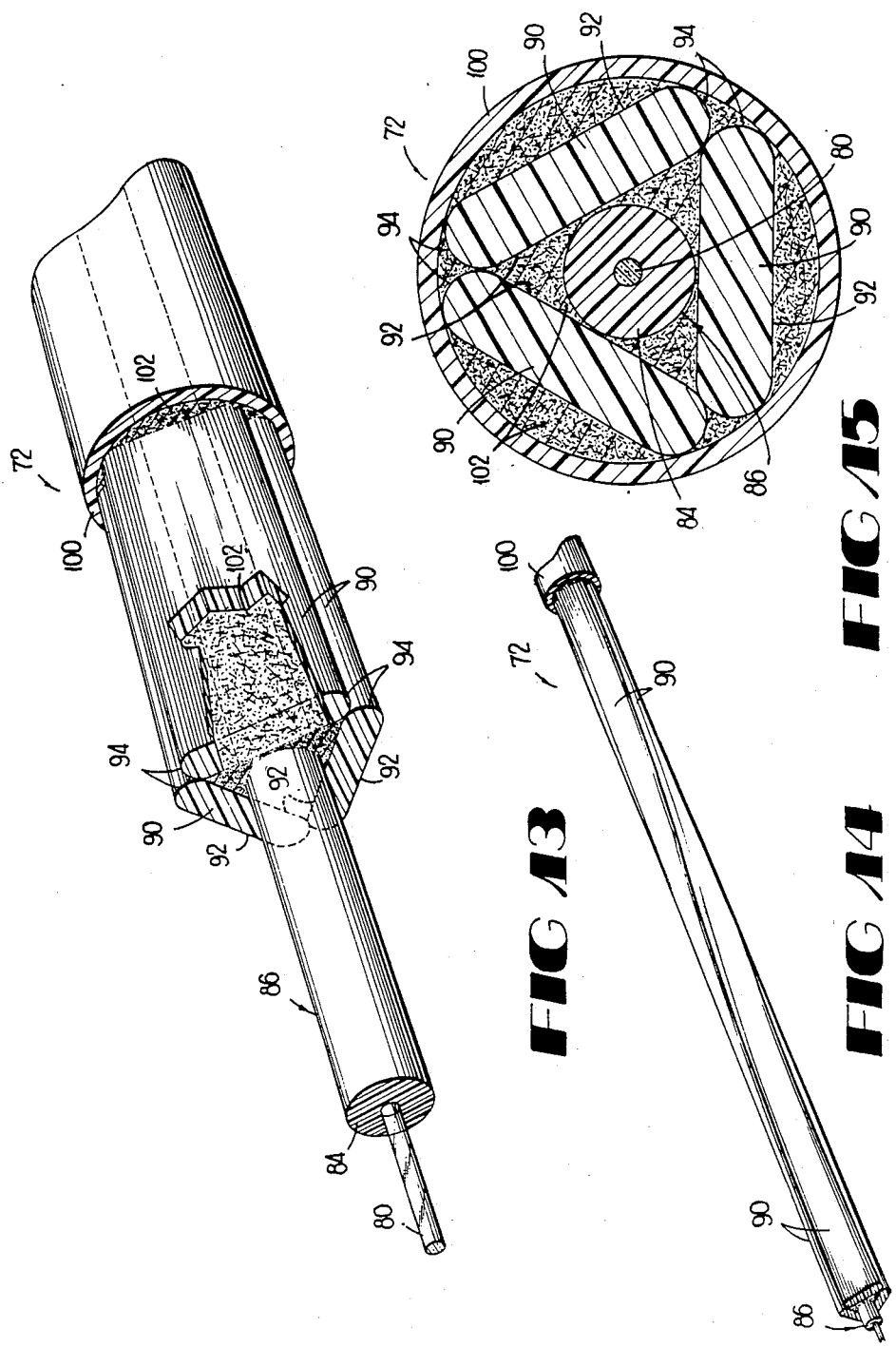

LOCAL AREA NETWORK SYSTEM

TECHNICAL FIELD

This invention relates to a local area network system. More particularly, it relates to a local area network system which includes distribution and service cables that provide service to customers' premises and which is suited ideally to facilitate a transition from an all metallic conductor to an optical fiber transmission system.

BACKGROUND OF THE INVENTION

A local area network system or loop distribution plant is effective to connect each telephone customer to a central office through a transmission medium. The transmission medium is commonly a twisted pair of insulated copper conductors which, for most of its length, is disposed in a multipair cable.

In a typical loop plant, a main feeder cable connects the central office to an area to be served. Branch feeder cables extend from the main cable to designated areas. Each branch cable connects to a plurality of distribution cables that extend service to a particular customer area. A distribution service cable connects a distribution cable to each customer premises.

The loop plant has evolved as new materials, methods and plant concepts were developed to provide reliable telephone service at a reasonable cost. Loop plant must be inexpensive to install and maintain, should require a relatively small amount of physical space, and be readily accessible to accommodate changes in service and in customers.

In a presently used arrangement referred to as a serving area concept (SAC), at least two copper conductor pairs are provided to each customer unit. One flexibility point, which is referred to as the serving area interface (SAI), is provided in each area and serves as an interface between cable pairs providing service from the central office and those to customer units.

In a typical SAC system for servicing residential customers, for example, a branch cable is routed from a central office main feeder cable to a serving area interface. From there, cables referred to as distribution backbone or subfeeder cables are extended across parallel streets, for example, and front or rear lot distribution laterals extended therefrom toward customers' premises. For such a system, each distribution backbone cable is tapered, that is, as it connects to each rear or front lot lateral, a portion of it is spliced to those laterals and a number of pairs from that point on are cut-dead ahead. This means that once a distribution pair is cut and spliced to a lateral pair extending toward a customer's premises, the remainder of that distribution pair to the end of the cable or ahead of the splice point is unused. As a result, half of the copper footage in these cables is wasted. Also, for each front or rear leg lateral, pairs beyond the splice points are unused. Service cables extend from the splice points to customers' premises. The splice points may include buried closures or service pedestals.

A system such as that just described has been used for some years but it does have some disadvantages. As described, it obviously includes a number of splice points each of which entails substantial labor costs, and which, historically, have been trouble points. Also, because pairs are cut-dead ahead, a portion of each cable beyond each splice point or beyond each point from which front or rear lot laterals extend goes unused.

The problems associated with presently used metallic conductor loop systems are exacerbated as the loop tends to become one in which optical fibers play a predominant role. As is known, optical fiber interface electronic devices which are required for an optical fiber loop are not yet generally available. When such devices become available, it is desirable that they be connected immediately into the loop. Accordingly, it becomes important now to provide a system which not only overcomes some of the disadvantages of prior art systems but also one which provides copper metallic as well as optical fiber capabilities to facilitate a transition from an all metallic conductor system to one in which any metallic conductors are used only to provide power.

Seemingly, the prior art does not include such a system. The sought-after system must be one which is easily installed, is economical and which includes metallic as well as optical fiber conductors.

SUMMARY OF THE INVENTION

The foregoing problems have been solved by the communications distribution system of this invention. The system includes a feeder distribution interface which is served by a feeder cable and at least one group interface which is disposed to serve a plurality of customer premises. A backbone cable segment is adapted to provide communications service for a plurality of customer premises from the feeder distribution interface for the group interface. At least one distribution service cable is connected to the backbone cable segment at the group interface and extends to provide service to a single customer's premises of the plurality of customer premises.

In one such system, a plurality of backbone cables extend from a remote terminal or a serving area interface along a right-of-way. Each of the backbone cables terminates at a single associated group interface which is located to be associated with a plurality of customers' premises of a subdivision, for example. From the group interface extend a plurality of distribution service cables with each of the distribution service cables extending from the group interface to a single customer's premises.

BRIEF DESCRIPTION OF THE DRAWINGS

Other features of the present invention will be more readily understood from the following detailed description of specific embodiments thereof when read in conjunction with the accompanying drawings, in which:

FIG. 5 is a schematic view of another embodiment of a distribution system in accordance with this invention;

FIG. 6 is a schematic view of still another arrangement in accordance with this invention;

FIG. 11 is a perspective view of a composite optical fiber-metallic conductor cable which is used to provide service from a group interface to a customer's premises;

FIG. 12 is a cross sectional end view of the cable of FIG. 11;

FIG. 13 is a perspective view of a reinforced optical fiber unit;

FIG. 14 is a perspective view of a portion of the reinforced optical fiber unit of FIG. 13;

FIG. 15 is a cross sectional end view of the reinforced optical fiber unit of FIG. 13; and FIG. 16 is an exemplary curve of applied stress versus strain for a waterblocking material of the reinforced optical fiber unit of FIG. 13.

DETAILED DESCRIPTION

Figure 1:
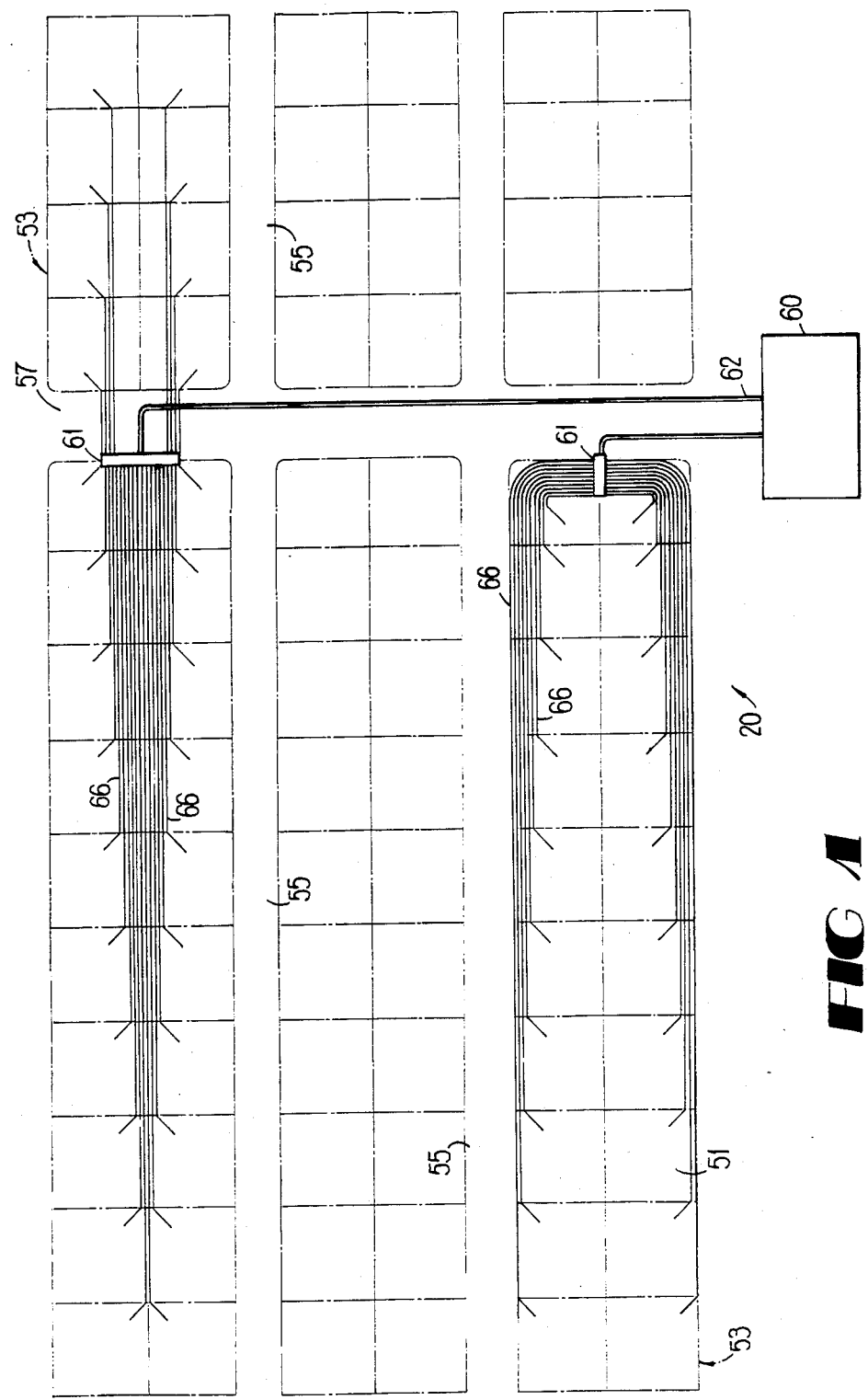
FIG. 1 is a schematic view of a system in accordance with this invention.

Referring now to FIG. 1, there is shown a schematic view of a distribution and service cable system. This system, which is designated generally the numeral 20, is adapted now to provide copper conductor and/or optical fiber cable service to customers' premises and to facilitate transition from the use of the copper conductors to the optical fiber as the primary transmission media. It is intended to replace prior art communications distribution systems such as the one which is shown in FIG. 2, for example and which is designated generally by the numeral 30.

Figure 2:
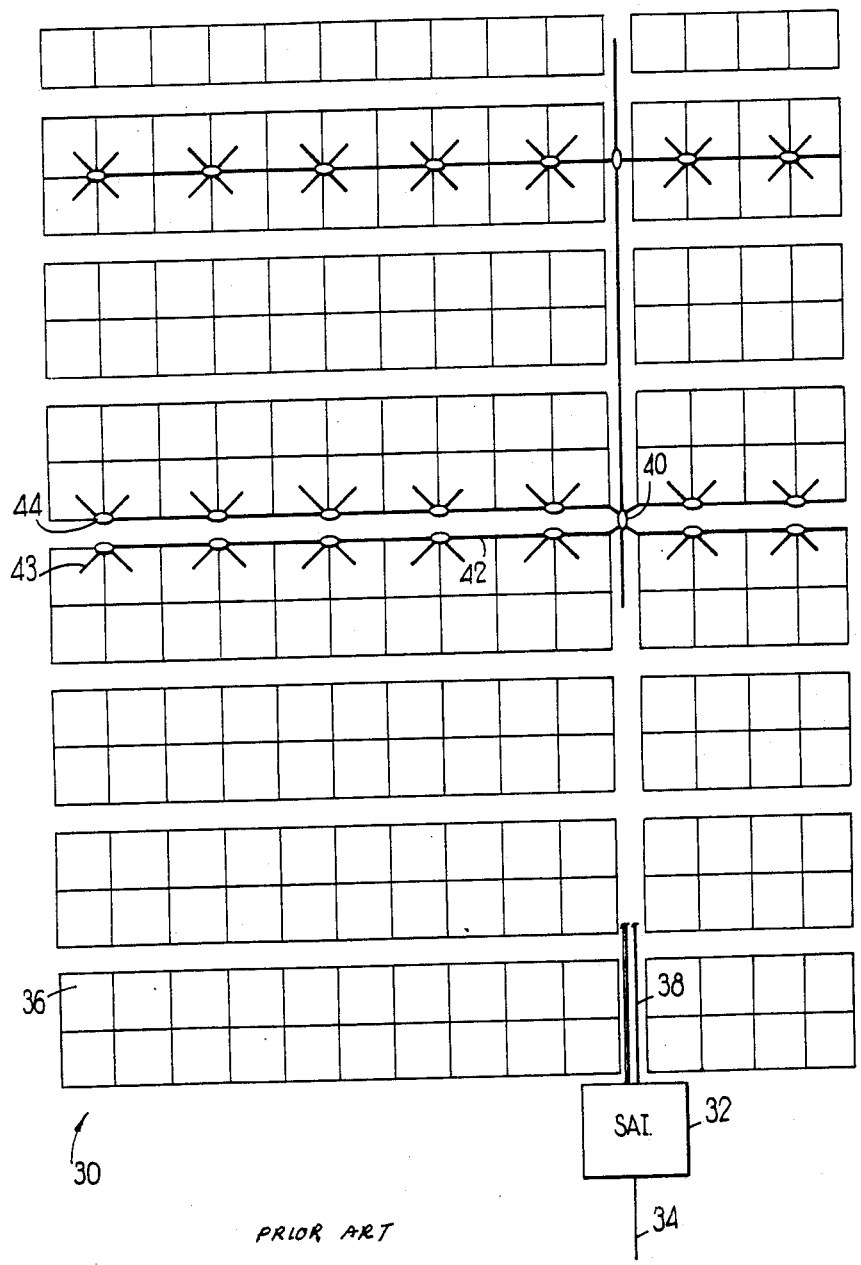
FIG. 2 is a schematic view of a prior art service distribution system.

In FIG. 2, a serving area interface (SAI) 32 is adapted to be fed by a feeder cable 34 or by a carrier system and to provide service to residential and business customers within a designated area. Each of a plurality of customer using units is designated with the numeral 36. From the SAI and along a right of way extends a backbone cable 38 having a plurality of insulated conductor pairs in a sheath system. At each of a plurality of locations along the backbone cable 38 is disposed a backbone splice closure 40. At each splice closure, a plurality of pairs of conductors are spliced to a distribution lateral cable 42 which extends laterally from the backbone cable along a plurality of front or rear lot customer locations. Service cables 43—43 interconnect the distribution cable 42 and customers' premises through a service closure 44.

As should be apparent in the prior art system of FIG. 2, those portions of the conductor pairs of a backbone cable which are spliced to a distribution cable and which are ahead of the backbone splice are unused. These unused pairs which, as will be recalled, are referred to as cut-dead-ahead pairs, are wasteful of materials and space. Space is wasted in that those pairs ahead of each splice point which remain unused occupy space yet serve no useful purpose.

Figure 3:
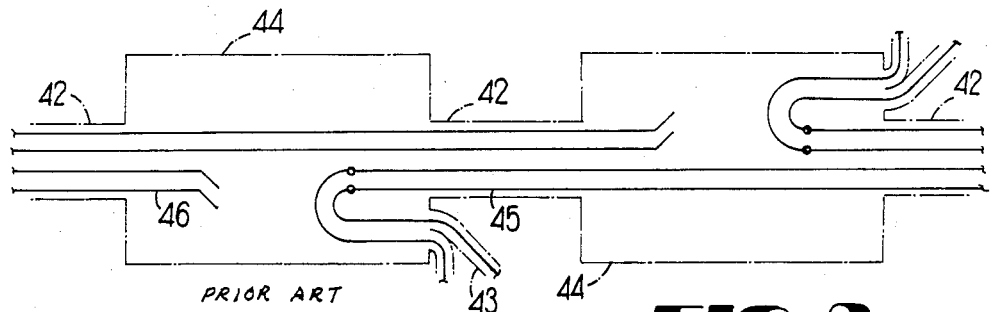
FIG. 3 is a detailed schematic view of cut-dead ahead pairs in a system of the prior art.

This same problem of waste occurs in the lateral cables. Therealong at each of a plurality of locations, service cables are spliced to conductors 45—45 of the distribution cable 42 at service closures 44—44 and run to customers' premises (see FIG. 3). Those portions 46—46 of the conductors 45—45 which have been spliced and which are ahead of the splice points remain unused, occupying space and being unused plant.

The system 20 which is shown in FIG. 1 overcomes these problems. For simplicity, an area has been subdivided into a plurality of lots or customer using units 51—51 with a plurality of lots comprising a unit 53. Front lot lines of opposing lots are spaced apart by a roadway 55. Also, as can be seen in FIG. 1, a plurality of units 53—53 are separated from another plurality by a right-of-way designated with a numeral 57.

The distribution system includes a remote terminal and/or serving area interface 60. From the remote terminal 60 along the right-of-way extend a plurality of backbone cable segments 62—62 each of which is adapted to provide communications service for a plurality of the units 51—51. In order to accomplish this, each backbone cable segment 62 extends from the remote terminal 60 to a single group interface 61. Accordingly, the length of each backbone cable segment 62 is sized to extend only from the remote terminal 60 to the associated group interface thereby avoiding the problem of unused in-ground plant of the system of FIG. 2.

From each group interface 61 extends a plurality of laterals which are referred to as distribution service cables and each of which is designated by the numeral 66. Each of the service cables 66—66 extends from a group interface 61 to a single one of the using units 51—51 which are associated with or served by that particular group interface.

The system of FIG. 1 is advantageous from the standpoint of the number of sheath violations and closures. For the system of FIG. 2, the cable sheath must be violated at each backbone splice closure 40 to accommodate cable splicing and tapering and then again at each service closure 44 to provide service to a home, for example. The system shown in FIG. 2 requires a plurality of splices along each run from a lateral along rear or front lot lines, whereas the system of FIG. 1 requires a splice or connector only at each group interface.

Figure 4:
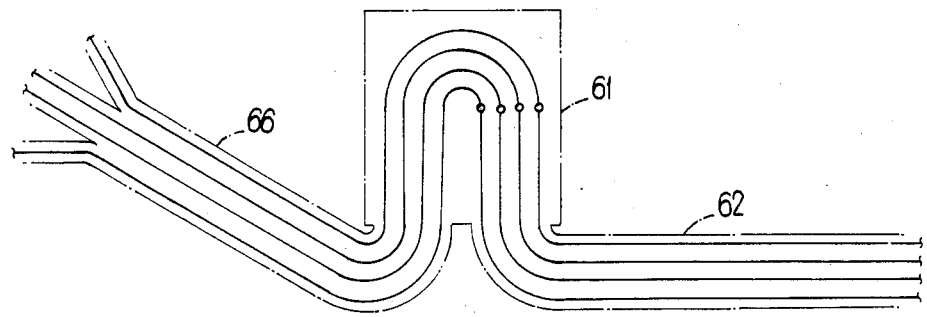
FIG. 4 is a schematic view of a connection arrangement between distribution backbone and service cables of this invention.

Another advantage of the system of FIG. 1 is that the waste of the system of FIG. 2 is reduced greatly. The cut-dead ahead pairs resulting from the system of FIG. 2 simply do not exist (see FIG. 4).

In the embodiment shown in FIG. 1, the distribution service cables extend laterally from the group interface and are run along the front or rear lots to customers' premises. Other arrangements are possible. For example, a star pattern may be used in which distribution service cables extend radially or laterally from a group interface 61 to customers' premises (see FIG. 5).

Still other arrangements are within the scope of this invention. For example, as shown in FIG. 6, the group interfaces 61—61 are connected by lateral distribution cables 63—63 to a backbone cable 64 at backbone splice closures 68—68 which also serve as taper points for the backbone cable. The backbone portion of this arrangement may result in a few cut-dead ahead pairs.

Figure 7:
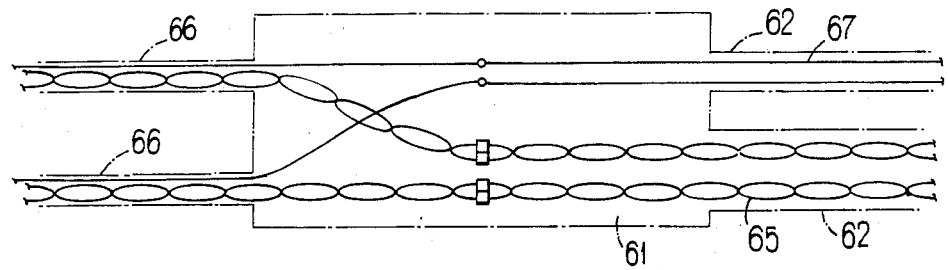
FIG. 7 is a schematic view of a portion of a cable system for transitioning from an all metallic conductor system to one in which optical fibers have been connected from a remote terminal to customers' premises.
Figure 8:
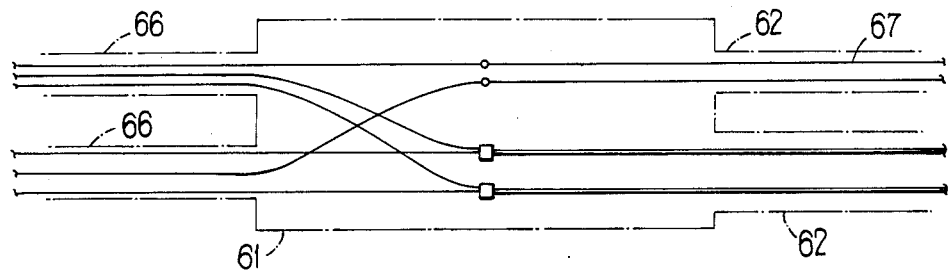
FIG. 8 is a schematic view of a later stage of the cable system shown in FIG. 7.

The system 20 of this invention is suited ideally to the task of transitioning from copper conductors in the loop for transmission and for power to a system in which optical fibers are used for transmission and copper conductors, for power. Initially in the system of FIG. 1, for example, cables which include twisted pairs of copper conductors 65—65, are used as the backbone cables 62—62 to feed each group interface (see FIG. 7). Backbone cables which include optical fibers 67—67 are installed but not connected, or preparations, such as conduit placement, are made to install and connect the optical fiber cables at a later date. From the group interface, composite optical fiber-metallic distribution service cables (FMC) extend laterally or radially to customers' premises. In the group interface, each of the metallic conductors of these optical fiber-metallic cables is spliced to a copper metallic backbone cable. This is the initial stage. Eventually, upon the general availability of fiber interface electronics, optical fiber backbone cables will be installed and spliced or previously installed optical fiber cables are spliced to the optical fibers of the composite optical fiber-metallic cables which already are in place. The copper conductors 65—65 continue to be used for signaling during a transition period. In what is perceived to be the final stage, the copper conductor backbone cables, which need only include parallel pairs of copper conductors instead of twisted pairs (see FIG. 8), become power cables and/or control cables to the remote terminal. At this stage, as it is now envisioned, each of the distribution service cables to a customer's premises is a composite optical fiber-metallic cable, with the metallic portion being used for power only. In the final generation system, the backbone and distribution service cables are optical fiber cables with power provided by on premist-power sources.

Figure 9:
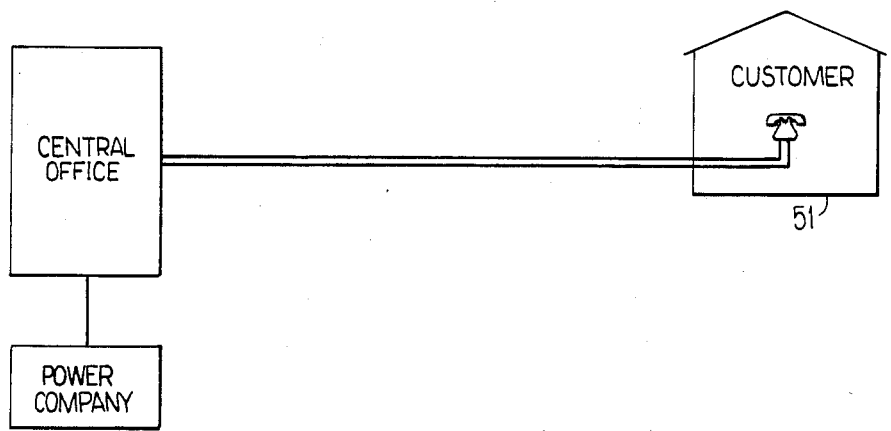
FIG. 9 is a schematic view of a system of service from a central office to a customer.
Figure 10:
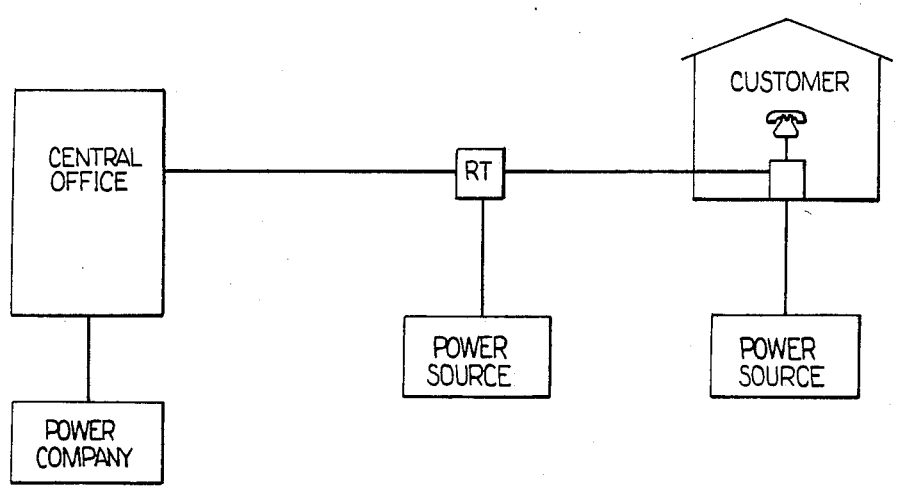
FIG. 10 is a schematic view of another system of service from a central office to a customer.

As can be seen in FIG. 9, a centrally powered optical fiber-metallic system provides service from a central office to a customer's premises which includes transmission and power. In the system which is shown in FIG. 10, inasmuch as power is not provided through the optical fiber circuit, it can be provided at any one of a plurality of locations such as at the remote terminal or at the customer's premises by the local power company or by a reliable battery source.

In the final phase of the transition from an all copper system to an all optical fiber communications transmission media, address number identification may be used to identify which customer is connected to each fiber. In priorly used systems, careful construction and color coding or ring-out are required to identify at the SAI the conductor pairs for each using unit. For the system of FIG. 1 where an optical fiber is the single transmission media for each customer's premises, an automatic number or address identifier at each customer premises may be used and identification accomplished remotely from the remote terminal.

As should be apparent, an important role in the development of the system described hereinbefore is that played by the distribution service cable 66. The sought-after cable should have desired properties. For example, it should have a relatively high tensile and compressive axial loading capability, a relatively low minimum bend radius, stiffness against bend losses in order to insure that the optical fiber unit does not follow the twists and turns of neighboring twisted pairs or insulated conductors and should remain as straight as possible to minimize bend losses, an operating temperature range of about −40° to +160° F., single or multi-mode capability and low cost. The cable should be properly cushioned to withstand repeated impacts by vehicles on structures routed across roadways during installation. Also, the structure must not be affected adversely by cable filling compounds. The cable must be water-resistant to prevent damage due to water-induced crack propagation or freezing. Inasmuch as in some instances it will connect to customers' premises, the cable must be capable of being made flame retardant.

A composite cable 70 (see FIGS. 11 and 12) which is suitable for use in the system 20 to provide service between a group interface and a customer's premises is one which is disclosed and claimed in application Ser. No. 019,719 which was filed on Feb. 27, 1987 in the names of F. J. Mullin and W. C. Reed.

Referring now to FIGS. 11 and 12, it is shown that the cable 70 includes a core 71 which includes one or more reinforced optical fiber units each of which is designated generally by the numeral 72. The cable 70 is a composite cable which is suitable for service to customer premises and includes the at least one reinforced optical fiber unit as well as one or more metallic conductors. The cable 70 may include at least one or more pairs of insulated metallic conductors 74—74.

Referring now to FIGS. 13-15 there is shown in detail one of the reinforced optical fiber units 72—72. The reinforced optical fiber unit 72 includes an optical fiber which is designated generally by the numeral 80 and which includes a coating. In a preferred embodiment, the optical fiber 80 is provided with a buffer coating 84. The buffer coating 84 typically comprises a polyester elastomer or polyvinyl chloride (PVC) plastic which has been extruded over the coated optical fiber. Typically the buffered optical fiber which is designated by the numeral 86 has an outer diameter of about 0.035 inch.

The buffered optical fiber 86 is enclosed by a plurality of fiber glass strength members each designated by the numeral 90. As can be seen in FIG. 15, each of the fiber glass strength members has an elongate cross section transverse of its longitudinal axis with the cross section defined by parallel sides 92—92 and by arcuately shaped ends 94—94

The strength members 90—90 must have suitable strength characteristics to prevent tensile load failure. Tensile load failure is caused by filament abrasion, flaws and tensile load imbalance. Filaments are abraded by neighboring filaments in the environment of use and by particles in a subsequently extruded jacket and is most severe under some conditions. Flaws occur with the probability that increases with the filament length and cause tensile load failures in a length of time which is approximately inversely proportional to the cable length. Uneven sharing of the tensile load results when the filaments are not coupled to share the tensile loads evenly. As some filaments break, others accept the load until the total cross section of the strength member fails.

Generally as a solution to these problems impregnated rovings or yarns are used as strength members. Impregnating material may be formed by condensation or addition polymerization reactions and may include, for example, urethanes, acrylic acid or acrylate-based materials, epoxies, polyesters, and polyvinyl chloride or other vinyl based materials. For strength member materials such as fiber glass, a coupling agent or sizing such as silane must be used to couple the impregnating material to the filaments; for material such as Kevlar ® fiber, a coupling agent may not be required.

In a preferred embodiment, impregnated fiber glass rovings or yarns are used as strength members. Impregnating material coats each filament with a layer which protects against abrasion and couples each filament to its neighbor to bridge flaws and establish tensile load balance.

Fiber glass impregnation is customarily accomplished by fiber glass suppliers. Glass filaments are drawn from a furnace bushing and cooled by water spray followed by the application of a water dispersion of silane. Drying removes excess water and alcohol, which formed as the silane bonds the glass and leaves silane-coated filament with organo-functional groups positioned to couple with the impregnating material. Each strength member is impregnated in a bath with the sized fibers being spaced apart to enhance the impregnation. For an example of a method of impregnating a bundle of filaments, see U.S. Pat. No. 4,479,984 which issued on Oct. 30, 1984 in the names of N. Levy and P. D. Pate. and which is incorporated by reference hereinto.

Impregnating roving or yarn overcomes a disadvantage of plain roving or yarn for the strength members. Unlike plain roving or yarn, any flaws in any of the filaments are bridged by the impregnating material which also prevents abrasion. Impregnation increases the flex life of the completed structure over that of unimpregnated roving. The impregnating material also serves as part of a waterblocking system for the reinforced optical fiber unit.

The strength members are of a flattened shape because of the manner in which they are manufactured. The rovings or yarn are spread over a bar so that the roving afterwards appears flat. This design is beneficial in that it enhances the protection for the buffered optical fiber 86. Further as can be seen in FIG. 14, the strength members 90—90 are assembled to the optical fiber in such a manner as to have a lay along the length of the lightguide reinforced unit 72. In a preferred embodiment, the lay length is about 4 inches.

It also should be observed that the strength members are arranged in a particular fashion about the buffered optical fiber 86. They are arranged so as have a generally triangular configuration with one of the parallel sides of each being adjacent to the buffered optical fiber which is enclosed by the three strength members. A light touching of the strength members to the optical fiber is permissible, but anything more could cause a loading of the optical fiber and may result in microbending losses. Other arrangements are within the scope of this invention. For example, two or more arcuately shaped strength members could be disposed about the optical fiber as could four strength members which form a square cross section.

What is important is that the strength members are organized to provide a composite columnar strength member which resists compressive forces applied axially. Advantageously, the strength members also provide transverse compressive strength which prevents collapse of the unit as it is moved through the extruder or experiences bending. Also, the array of strength members function as a heat barrier during extrusion. The strength members must be decoupled sufficiently from the optical fiber to prevent the transfer of forces thereto. Decoupling also is important because of the relationship of the tightness between the sheath components and the optical fiber to the response time required for the optical fiber to return to a low stress state after having been stressed during bending or thermal cycling, for example.

The reinforced optical fiber unit 72 also includes a jacket which is designated generally by the numeral 100. The jacket may be made of a material such as polyvinyl chloride (PVC) which has suitable resistance to flame spread and smoke evolution. Typically, the jacket comprises a nylon material, for example, in order to provide it with toughness and resistance to abrasion, impact and compression.

The reinforced optical fiber unit 72 is sized so that it may be an approximate size replacement for a copper distribution pair in a cable. The outside diameter of the jacket 100 is about 0.130 inch. The reinforced optical fiber unit 72 has been shown to include one optical fiber which is buffered. However, the unit may still have its same outer diameter, and the buffered fiber may be replace with two or more unbuffered optical fibers. Or the buffer 84 which typically has an outer diameter of 0.035 inch may be replaced with one or more optical fibers each of which is enclosed by a thinner buffer layer.

Interposed between the jacket 100 and the strength members 90—90 of the reinforced optical fiber unit 72 and between the strength members and the buffered optical fiber 86 is a filling composition of matter 102. This composition of matter provides suitable waterblocking characteristics for the reinforced optical fiber unit 72. The filling material 102 must possess certain properties. It has been determined that in an optical fiber cable, a filling composition must also function to maintain the optical fibers in a relatively low state of stress. Such a material is a colloidal particle-filled grease composition such as that disclosed in patent application Ser. No. 697,054 which was filed Jan. 31, 1985, now U.S. Pat. No. 4,701,016 and which is incorporated by reference hereinto. The composition of the waterblocking material 102 is intended to block effectively entry of water into the core while minimizing the added loss to the cable in order to provide excellent optical performance.

A grease typically is a solid or semiliquid substance comprising a thickening or gelling agent in a liquid carrier. The gelling agents used in greases frequently are fatty acid soaps, but high melting point materials, such as clays, silicas, organic dyes, aromatic amides, and urea derivatives also may be used.

When a low stress is applied to a grease, the material acts substantially as a solid-like material. If the stress is above a critical value, then the viscosity decreases rapidly and the material flows. The decrease in viscosity is largely reversible because typically it is caused by the rupture of network junctions between filler particles, and these junctions can reform following the removal of the supercritical stress.

A cable filling or waterproofing material, especially an optical fiber cable filling compound, should meet a variety of requirements. Among them is the requirement that the physical properties of the cable remain within acceptable limits over a rather wide temperature range, e.g. from about $-40°$ F. to about $160°$ F. It is also desirable that the filling material be relatively free of syneresis over the aforementioned temperature range. Syneresis is the separation of oil from the gel under applied stress. Filling materials for use in optical fiber cables also should have a relatively low shear modulus. According to the prior art, the shear modulus is a critical material parameter of optical fiber cable filling materials because it is believed to be directly related to the amount of microbending loss. For a discussion of microbending loss, see S. E. Miller et, al., *Optical Fiber Telecommunications,* Academic Press, New York (1979), pp. 158-161.

The preferred waterblocking material is a composition which comprises two major constituents, namely oil, and a gelling agent such as colloidal particles, and, optionally, a bleed inhibitor. Preferably, the waterblocking composition includes a thermal oxidative stabilizer.

Among the oils useful in the waterblocking material are polybutene oils having a minimum specific gravity of about 0.83 and a maximum pour point, as per ASTM D97, of less than about 18° C., or ASTM type 103, 104A, or 104B, or mixtures thereof, per ASTM D-226 test, of naphthenic or paraffinic oils having a minimum specific gravity of about 0.86, and a maximum pour point, per ASTM D97, of less than about −4° C. Specific examples of oils useful in the cable of the invention are a polybutene oil, which is a synthetic hydrocarbon oil having a pour point per ASTM D97 of −35° C., an SUS viscosity of 1005 at 99° C., a specific gravity of 0.8509, and an average molecular weight of 460. It is available from the Amoco Chemical Corporation, Texas City, Tex., under the trade designation L-100. Another example oil is a white mineral oil, having a pour point per ASTM D97 of −25° C., an SUS viscosity of 53.7 at 99° C., an average specific gravity of 0.884, and maximum aromatic oils 1% by weight (b.w.). The latter is available from Penreco of Butler, Penn., under the designation Drakeol 35. Other oils include triglyceride-based vegetable oils such as castor oil and other synthetic hydrocarbon oils such as polypropylene oils. For applications requiring fire-retardant properties, chlorinated paraffin oils having a chlorine content of about 30–75% b.w. and a viscosity at 25° C. of between 100 and 10,000 cps are useful. An example of such oil is Paroil 152, which is available from the Dover Chemical Company of Dover, Ohio.

Oil-retention of the inventive greases may be improved by the addition of one or more bleed inhibitors to the composition. The bleed inhibitor can be a rubber block copolymer, a relatively high viscosity semiliquid, sometimes referred to as semisolid rubber, or other appropriate rubber. Block copolymers and semiliquid rubbers will be referred to collectively as rubber polymers. Incorporating a rubber polymer into the grease composition allows a reduction in the amount of colloidal particle that must be added to the mixture to prevent syneresis of the gel. This reduction can result in cost savings. Furthermore, it makes possible the formulation of nonbleeding compositions having a relatively low critical yield stress.

Among the rubber block copolymers that can be used in waterblocking compositions for the cable of the invention are styrene-rubber and styrene-rubber-styrene block copolymers having a styrene/rubber ratio between approximately 0.1 and 0.8 and a molecular weight, as indicated by viscosity in toluene at 25° C., of from about 100 cps in a 20% b.w. rubber solution to about 2000 cps in a 15% b.w. rubber solution. Exemplary block rubbers are (a) a styrene-ethylene-propylene block copolymer (SEP), unplasticized, having a styrene/rubber ratio of about 0.59, a specific gravity of about 0.93, a breaking strength per ASTM D-412 of 300 psi, and being available from the Shell Chemical Company of Houston, Tex., under the trade designation Kraton G1701; (b) styrene-ethylene-butylene block copolymer (SEB), having a styrene/rubber ratio about 0.41, and being available from the Shell Chemical Company under the designation TRW-7-1511; (c) styrene-ethylene-butylene-styrene block copolymer (SEBS), unplasticized, and having a styrene/rubber ratio of about 0.41, a specific gravity of about 0.91, 500% elongation, 300% modulus per ASTM D-412 of 700 psi, and being available from the Shell Chemical Corporation under the trade designation Kraton G1652. Other styrene-rubber or styrene-rubber-styrene block copolymers are styrene-isoprene rubber (SI) and styrene-isoprene (SIS) rubber, styrene-butadiene (SB) and styrene-butadiene-styrene (SBS) rubber. An example of SIS is Kraton D1107, and an example of SBS is Kraton D1102, both available from the Shell Chemical Company.

Among the semiliquid rubbers found useful are high viscosity polyisobutylenes having a Flory molecular weight between about 20,000 and 70,000. Exemplary thereof is a polyisobutylene having a Flory molecular weight of about 42,600–46,100, a specific gravity of about 0.91, and a Brookfield viscosity at 350° F. (about 177° C.) of about 26,000–35,000 cps, and available from the Exxon Chemical Company of Houston, Tex., under the trade designation Vistanex LM-MS. Other rubbers which are considered to be useful are butyl rubber, ethylene-propylene rubber (EPR), ethylene-propylene dimer rubber (EPDM), and chlorinated butyl rubber having a Monney viscosity ML 1+8 at 100° C. per ASTM D-1646 of between about 20 and 90. Examples of the above are Butyl 077, Vistalon 404, Vistalon 3708, and Chlorobutyl 1066, respectively, all available from the Exxon Chemical Company. Also useful are depolymerized rubbers having a viscosity of between about 40,000 and 400,000 cps at 38° C. An example thereof is DPR 75 available from Hardman, Inc. of Belleville, N.J.

Colloidal filler particles in oil gel the oil by bonding surface hydroxyl groups to form a network. Such gels are capable of supporting a load below a critical value of stress. Above this stress level, the network is disrupted, and the material assumes a liquid-like character and flows under stress. Such behavior is often referred to as thixotropic.

Colloidal fillers useful in the cable of the invention include colloidal silica, either hydrophilic or hydrophobic, preferably a hydrophobic fumed silica having a BET surface area between about 50 and about 400 m$^2$/gm. An example of a hydrophobic fumed silica is a polydimethylsiloxane-coated fumed silica having a BET surface area of about 80–120 m$^2$/gm, containing about 5% b.w. carbon, and being available from the Cabot Corporation of Tuscola, Ill. under the trade designation Cab-O-Sil N70-TS. An exemplary hydrophilic colloidal material is fumed silica with a BET surface area of about 175–225 m$^2$/gm, nominal particle size of 0.012 $\mu$m, and a specific gravity of 2.2, available from the Cabot Corporation under the designation Cab-O-Sil M-5. Other colloidal fillers useful in the practice of the invention are precipitated silicas and clays such as bentonites, with or without surface treatment.

FIG. 16 shows a generalized stress-strain curve 103 at constant strain rate for a thixotropic material such as that used as the waterblocking material 102, and identifies several important parameters. In segment 105 of the stress-strain curve 103, the material acts essentially an an elastic solid. The segment 105 extends from zero stress to the critical yield stress $\sigma_c$. The strain corresponding to $\sigma_c$ is identified as $\gamma_c$, the critical shear strain. By definition, the coordinates $\sigma_c$, $\gamma_e$ indicate the onset of yielding and the quantity $\sigma_c/\gamma_c$ (or $d\sigma/d\gamma$ for $\sigma < \gamma_c$) is known as the shear modulus ($G_e$) of the material.

The prior art teaches that filling materials for optical fiber cable need to have low values of $G_e$. However, it has been determined that, at least for some applications, a low value a $G_e$ of the filling material is not sufficient to assure low cabling loss, and that a further parameter, the critical yield stress, $\sigma_c$, also needs to be controlled. Typically, the critical yield stress of material according to the invention is not greater than about 70 Pa, measured at 20° C. whereas the shear modulus is less than about 13 kPa at 20° C.

A segment 106 of the stress-strain curve of FIG. 16 represents increasing values of the incremental strain for increasing stress. The stress $\sigma_y$ is the maximum value of stress sustainable by the material at a given strain rate with $\gamma_y$ being the corresponding strain. For strains in excess of $\gamma_y$, the stress at first decreases as shown by segment 108, becoming substantially independent of strain for still greater values of strain as shown by the segment 109. The waterblocking material thus exhibits a liquid like behavior for $\gamma > \gamma_y$.

A preferred filling composition 102 for the unit 72 typically comprise about 91.4 to 94.0% by weight (b.w.) oil and preferably about 92.8 to 93% by weight (b.w) Drakeol 35 oil and about 6 to 8.5% b.w. colloidal filler and preferably about 6.9 to 7.1% b.w. of N70-TS hydrophobic fumed silica. The preferred composition also includes about 0.1% b.w. of an oxidative stabilizer. An exemplary stabilizer is tetrakis methane, available from CIBA-GEIGY under the trade designation Irganox 1010. Another composition which may be suitable for filling the unit 72 provides about 92.5 to 93.5% b.w. of an extender oil such as Drakeol 35, about 6.5 to 7.5% b.w. of a rubber such as Kraton G 1652 and 0.2% b.w. of an antioxidant such as Irganox 1010 or 1035 material.

The compositions were prepared by known methods, typically comprising the constituent materials first at ambient temperature and pressure, then at ambient temperature under a partial vaccum (typically less than about 300 Torr). The resulting compositions were evaluated, including a determination of $\sigma_c$ and $G_e$ of some by cone-and-plate rheometry. An exemplary summary of the properties of the preferred composition is as follows with all measurements of $\sigma_c$ and $G_e$ being at 20° C. (a) $\sigma_c$ (Pa)=10, $G_e$ (kPa)=1.8; (b) $\sigma_c$(Pa)=10 and $G_e$ (kPa)=1.8, time in hours =16. The stress values designated (a) were determined without aging while those designated (b) were aged for the time indicated.

Advantageously, the waterblocking material 102 which is used to fill the core of the unit 72 of this invention yields at a low enough stress so that the optical fiber 80 is capable of moving when the unit is loaded or bent. Because the yielding filling material 102 allows the optical fiber to move within the unit 72, the stress therein is reduced, microbending is minimized and the life of the optical fiber is lengthened.

The filling material 102 for the reinforced optical fiber unit 72 also may be flame-retardant. This may be accomplished by including in the hereinbefore described composition a flame-retardant constituent such a chlorinated paraffin and/or $Al_2O_3 . 3H_2O$.

As indicated hereinbefore, the distribution cable 70 includes one or more reinforced optical fiber units 72-72 and one or more metallic conductors and/or one or more twisted pairs of insulated metallic conductors 74—74 (see FIGS. 11 and 12). Viewing again FIGS. 11 and 12 it can be seen that each of the insulated conductors 74—74 includes a metallic portion 112 and insulation 114 which has been extruder thereover. Typically, each of the metallic conductor portions 112—112 is 22 AWG wire and is insulated with polyethylene plastic material, for example. The diameter-over-dielectric (DOD) of each insulated conductor 114 is such that the mutual capacitance of a pair of conductors insulated with the polyethylene is 0.083 $\mu$F/mile. As a result, the circuit length of the metallic pair can be about 7 miles which does not unduly limit the optical fiber length. Also, advantageously, each reinforced optical fiber unit 72 having an outer diameter of 0.130 inch can replace a conductor pair each of which has an outer diameter of 0.057 inch.

The distribution cable of this invention may include any of several sheath systems depending on the requirements of the environment of use. For example in FIG. 12, there is shown a distribution service cable which includes the reinforced optical fiber unit and twisted metallic conductor pairs enclosed by a gopher-resistant sheath system designated 120 which includes a helically wrapped laminate 122 comprising copper and stainless steel. The copper-stainless steel, helically wrapped laminate 122 overlies an inner jacket 25 which may be made of high density polyethylene. Covering the outside of the copper-stainless steel laminate is an outer jacket 126 which in a preferred embodiment is made of flame retardant polyvinyl chloride (PVC) plastic material. The outer diameter of the cable 70 is about 0.350 inch.

For all buried applications, the core is filled with a waterblocking composition of matter 139 (see FIGS. 11 and 12). Such a material may comprise Flexgel ® material which is disclosed and claimed in U.S. Pat. No. 4,176,240 which issued on November, 1979 in the name of R. Sabia and which is incorporated by reference hereinto. As can be seen in aforementioned U.S. Pat. No. 4,176,240, the Flexgel filling compound comprises a mineral oil, styrene block copolymer rubber and polyethylene. Should the buried cable be routed adjacent to a customer's premises, the composition of matter should also include a chlorinated paraffin material comprising about 70% b.w. chlorine.

With the cable structure described hereinbefore as initially in place, service will evolve from metallic conductor pairs to optical fibers. Simple telephone service can begin immediately over a metallic pair of conductors. Other metallic conductor pairs of the distribution and service cable can serve as secondary lines or alarm circuits.

At a later date, more sophisticated offerings which required increased bandwidth and customer interaction such as, for example, electronic newspapers and mail, catalogs, cable television and shopping, banking and business activities and data and computer functions may be served through a remote terminal. For this application, metallic conductor pairs may provide power to on-premises electronic devices or serve as control circuits. Still later, all offerings may be provided over the optical fiber media, but power still will have to be provided for on-site electronics by the power or telephone operating company or by reliable on-premises power sources. Providing power from a central office source through these structures or from a reliable on-premises source should result in reliable telecommunications during power outages. Also, the copper conductor pairs may have other uses such as circuit maintenance, for example.

It should be understood that whereas the optical fibermetallic cable has been described in a buried environment, it also could be installed aerially. Further, the system of this invention including the interfaces could be disposed in an aerial installation or in a combined buried-aerial installation.

It should be understood that the above described arrangements are simply illustrative of the invention. Other arrangements may be devised by those skilled in the art which will embody the principles of the invention and fall within the scope and spirit thereof.

What is claimed is:

1. A communications distribution system, which comprises:
   a feeder distribution interface which is served by a feeder cable;
   at least one group interface which is adapted to serve a plurality of customer premises;
   a backbone cable which is adapted to provide communications service for a plurality of customer premises from said feeder distribution interface for said group interface; and
   a distribution service cable which is provided for and associated with each customer premises of said plurality of customer premises, each said distribution service cable being connected at said group interface to said backbone cable and extending from said group interface to a single customer premises of said plurality of customer premises.

2. A communications distribution system for local business and residential service, said system comprising:
   a feeder distribution interface which is served by a feeder cable;
   at least one group interface which is disposed to serve a plurality of customer premises;
   a backbone cable segment which is adapted to provide communications service for plurality of customer premises from said feeder distribution interface to a single group interface; and
   a distribution service cable which is provided for and associated with each customer premises of said plurality of customer premises, each said distribution service cable being connected to said backbone cable segment at said group interface and extending to provide service to a single customer premises of said plurality of customer premises.

3. The system of claim 2, wherein a purality of distribution service cables extend radially from each said group interface.

4. The system of claim 2, wherein a plurality of distribution cables extend laterally from each said group interface.

5. The system of claim 2, wherein a plurality of backbone cable segments extend from said feeder distribution cable interface along a common path with a plurality of distribution service cables extending from each of said backbone cables at predetermined locations to serve a plurality of customer premises.

6. The system of claim 2, wherein said at least one distribution service cable includes
   a core which comprises:
      at least one reinforced optical fiber unit, which comprises:
         at least one optical fiber;
         a plurality of discrete impregnated fibrous strength members which cooperate to enclose said at least one optical fiber and being decoupled therefrom to provide tensile strength and to provide columnar strength which resists compression; and
         a jacket which is made of plastic material and which encloses said strength members; and
      at least one metallic conductor; and
   a sheath system which encloses said at least one optical fiber unit and said at least one metallic conductor and which includes an outer plastic jacket.

7. The system of claim 6, wherein said core includes at least one twisted pair of insulated metallic conductors.

8. The system of claim 6, wherein said strength members include three impregnated fiber glass strength members each having a cross section which includes two generally parallel sides which are joined at their ends by arcuate portions, each strength member being adjacent to said optical fiber to form a triangular array and wherein said jacket touches generally the apices of the triangular array.

9. The system of claim 6, wherein said at least one optical fiber is provided with a coating of plastic material and with a buffer layer of a plastic material.

10. The system of claim 6, which also includes a waterblocking material which is disposed within said jacket of said optical fiber unit to fill interstices between said jacket of said optical fiber unit and said strength members and between the strength members and said optical fiber.

11. The system of claim 10, wherein said waterblocking material is a composition of matter which comprises about 91.4 to 94% by weight of an oil selected from the group consisting of:
    (a) paraffinic oil having a minimum specific of: of about 0.86 and a pour point less than $-4°$ C. and being of ASTM type 103, 104A or 104B;
    (b) naphthenic oil having a minimum specific gravity of about 0.86 and a pour point less than $-4°$ C. and being of ASTM type 103, 104A or 104B;
    (c) polybutene oil having a minimum specific gravity of about 0.83 and a pour point less than $18°$ C.; and
    (d) any mixture thereof.

12. The system of claim 11, wherein said composition of matter also includes about 6 to 8.5% by weight colloidal particles selected from the group consisting of hydrophobic fumed silica, hydrophilic fumed silica, precipitated silica and clay, the colloidal particles having a BET surface area in the range from about 50 to about 400 $m^2/g$.

13. The system of claim 11, which also includes not more than about 8% by weight of a bleed inhibitor selected from the group consisting of styrene-rubber-styrene block copolymers having a styrene/rubber ratio between about 0.1 and about 0.8, semiliquid rubber having a Flory molecular weight between 20,000 and 70,000, butyl rubber, ethylene-propylene rubber, ethylene-propylene dimer rubber, chlorinated butyl rubber having a Mooney viscosity at $100°$ C. between about 20 and 90, and depolymerized rubber having a viscosity at $38°$ C. between about 40,000 and 400,000 cps.

14. The system of claim 10, wherein said waterblocking material is a composition of matter which comprises:
    (a) about 92.8 to 83% by weight of an oil selected from the group consisting of:
       i. paraffinic oil having a minimum specific gravity of about 0.86 and a pour point of less than $-4°$ C. and being of ASTM type 103, 104A, or 104B;
       ii. naphthenic oil having a minimum specific gravity of about 0.86 and a pour point less than $-4°$ C. and being of ASTM type 103, 104A or 104B;
       iii. polybutene oil having a minimum specific gravity of about 0.83 and a pour point of less than $18°$ C.;
       iv. triglyceride-based vegetable oil;
       v. polypropylene oil;

vi. chlorinated paraffin oil having a chlorine content between about 30 and 75% by weight and a viscosity at 25° C. of between 100 and 10,000 cps;
vii. polymerized esters, and
viii. any mixture thereof; and (b) about 0.1% by weight of an antioxidant stabilizer.

15. The system of claim 14, wherein said composition also includes about 6.9 to 7.1% by weight by hydrophobic fumed silica colloidal particles.

* * * * *